US012573896B2

(12) United States Patent
Boulanger

(10) Patent No.: US 12,573,896 B2
(45) Date of Patent: Mar. 10, 2026

(54) POWER TOOL WITH PERMANENT MAGNET SYNCHRONOUS RELUCTANCE MACHINE

(71) Applicant: MILWAUKEE ELECTRIC TOOL CORPORATION, Brookfield, WI (US)

(72) Inventor: Keith Boulanger, Kenosha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/493,022

(22) Filed: Oct. 24, 2023

(65) Prior Publication Data

US 2024/0136872 A1    Apr. 25, 2024
US 2024/0235292 A9    Jul. 11, 2024

Related U.S. Application Data

(63) Continuation of application No. 17/075,899, filed on Oct. 21, 2020, now Pat. No. 11,799,334.

(Continued)

(51) Int. Cl.
*H02K 1/27* (2022.01)
*B25F 5/02* (2006.01)
(Continued)

(52) U.S. Cl.
CPC .............. *H02K 1/276* (2013.01); *B25F 5/02* (2013.01); *H02K 7/145* (2013.01); *H02K 21/14* (2013.01)

(58) Field of Classification Search
CPC ...... H02K 1/2766; H02K 21/14; H02K 1/276; H02K 7/145; H02K 1/246; H02K 1/165;
(Continued)

(56) References Cited

U.S. PATENT DOCUMENTS 7,436,095 B2    10/2008    Aydin et al.
7,459,821 B2    12/2008    Ho Cheong et al.
(Continued)

FOREIGN PATENT DOCUMENTS

CN    102801236 A    11/2012
CN    106533103 A    3/2017
(Continued)

OTHER PUBLICATIONS

International Search Report and Written Opinion for Application No. PCT/US2020/056568 dated Feb. 3, 2021 (9 pages).
(Continued)

*Primary Examiner* — Leda T Pham
(74) *Attorney, Agent, or Firm* — Michael Best & Friedrich LLP

(57) ABSTRACT

A power tool including a housing and a motor assembly positioned within the housing. The motor assembly includes a stator with winding slots that receive stator windings and a rotor. The rotor includes a rotor body with a first slot positioned a first distance from a center of the rotor body, a second slot positioned a second distance from the center of the rotor body, and a third slot positioned a third distance from the center of the rotor body. The first slot, the second slot, and the third slot are curved about a common center. The rotor further includes a first magnet positioned within the first slot, a second magnet positioned within the second slot, and a third magnet positioned within the third slot.

17 Claims, 6 Drawing Sheets

Related U.S. Application Data

(60) Provisional application No. 62/924,329, filed on Oct. 22, 2019.

(51) Int. Cl.
  H02K 1/276 (2022.01)
  H02K 7/14 (2006.01)
  H02K 21/14 (2006.01)

(58) Field of Classification Search
  CPC ........ H02K 1/26; H02K 1/146; H02K 19/103; H02K 3/18; H02K 1/16; H02K 19/10; B25F 5/02
  See application file for complete search history.

(56) References Cited

U.S. PATENT DOCUMENTS

| | | | |
|---|---|---|---|
| 10,211,690 B2 | 2/2019 | Laldin | |
| 2014/0167549 A1* | 6/2014 | Huang | H02K 1/246 |
| | | | 310/156.07 |
| 2015/0303749 A1* | 10/2015 | Okubo | H02K 21/14 |
| | | | 310/156.38 |
| 2017/0317540 A1* | 11/2017 | Laldin | H02K 1/2766 |
| 2018/0138765 A1 | 5/2018 | Filipeti et al. | |
| 2018/0269734 A1* | 9/2018 | Soma | H02K 21/14 |
| 2019/0068036 A1 | 2/2019 | Mazza et al. | |
| 2019/0173336 A1* | 6/2019 | Takeuchi | H02K 1/246 |

FOREIGN PATENT DOCUMENTS

| | | |
|---|---|---|
| JP | 2002010594 A | 1/2002 |
| KR | 1020140143799 A | 12/2014 |

OTHER PUBLICATIONS

Extended European Search Report for Application No. 20878314.2 dated Oct. 24, 2023 (9 pages).

Chinese Patent Office Action for Application No. 202080079910.7 dated Mar. 13, 2025 (23 pages including English translation).

* cited by examiner

POWER TOOL WITH PERMANENT MAGNET SYNCHRONOUS RELUCTANCE MACHINE

CROSS-REFERENCE TO RELATED APPLICATIONS

This application is a continuation of U.S. patent application Ser. No. 17/075,899, filed Oct. 21, 2020, now U.S. Pat. No. 11,799,334, which claims the benefit of U.S. Provisional Patent Application No. 62/924,329, filed on Oct. 22, 2019, the entire content of each of which is hereby incorporated by reference.

FIELD OF THE DISCLOSURE

The present disclosure relates to power tools, and more particularly to power tools with a permanent magnet motors.

SUMMARY OF THE DISCLOSURE

The disclosure provides a power tool including a housing and a motor assembly positioned within the housing. The motor assembly includes a stator with winding slots that receive stator windings and a rotor. The rotor includes a rotor body with a first slot positioned a first distance from a center of the rotor body and a second slot positioned a second distance from the center of the rotor body. The first slot and the second slot are curved about a common center. The rotor further includes a first magnet positioned within the first slot and a second magnet positioned within the second slot.

The disclosure provides a motor assembly for a power tool that includes a stator with winding slots that receive stator windings, and a rotor including a rotor body with a first slot positioned a first distance from a center of the rotor body and a second slot positioned a second distance from the center of the rotor body. The first slot and the second slot are each curved about a common point. The rotor further includes a first magnet positioned within the first slot and a second magnet positioned within the second slot.

In some aspects, the common point is positioned outside of the rotor body.

In some aspects, a first dimension is measured between a first end of the first slot and an outer circumferential surface of the rotor body, a second dimension is measured between a second end of the first slot and the outer circumferential surface of the rotor body, and the second dimension is equal to the first dimension.

In some aspects, a first dimension is measured between an end of the first slot and an outer circumferential surface of the rotor body, a second dimension is measured between an end of the second slot and the outer circumferential surface of the rotor body, and the second dimension is equal to the first dimension.

In some aspects, the first magnet spans within a range of 50% to 100% of the first slot.

In some aspects, the first magnet spans within a range of 50% to 56% of the first slot.

In some aspects, the first magnet spans 53% of the first slot.

In some aspects, the second magnet spans within a range of 33% to 100% of the second slot In some aspects, the second magnet spans within a range of 33% to 39% of the second slot.

In some aspects, the second magnet spans 36% of the second slot.

In some aspects, a third slot is positioned a third distance from the center of the rotor body, the third slot is curved about the common point, and a third magnet positioned within the third slot.

In some aspects, the third magnet spans within a range of 35% to 100% of the third slot.

In some aspects, the third magnet spans within a range of 35% to 41% of the third slot.

In some aspects, the third magnet spans 38% of the third slot.

In some aspects, the motor is configured to drive a cyclical load.

In some aspects, the motor provides more startup torque than a brushless DC motor with a same package size and provides a higher no-load speed than the brushless DC motor with the same package size.

In some aspects, a tool element and wherein the tool element is driven by the motor.

In some aspects, the stator includes at least twenty-four slots.

In some aspects, the rotor is a 4-pole rotor.

The disclosure provides a power tool including a housing and a permanent magnet synchronous reluctance machine positioned within the housing. The permanent magnet synchronous reluctance machine includes a stator with stator windings, a rotor with a plurality of slots, and a magnet positioned within each of the plurality of slots. The power tool further includes a tool element driven by the permanent magnet synchronous reluctance machine.

In some aspects, the permanent magnet synchronous reluctance machine provides more startup torque than a brushless DC motor with a same package size and provides higher no-load speed than the brushless DC motor with the same package size.

In some aspects, the plurality of slots are curved.

In some aspects, the magnet within each of the plurality of slots span less than 56% of the slot.

In some aspects, the permanent magnet synchronous reluctance machine includes at least twenty-four winding slots formed in the stator and the rotor includes at least four poles.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the disclosure will become apparent by consideration of the detailed description and accompanying drawings.

DETAILED DESCRIPTION

Power tools that include an electric motor for driving fans, pumps, compressors, etc., experience variable load conditions. For example, one load condition may be a high startup torque requirement, while a second load condition may be a high no-load speed. Furthermore, the load conditions may be cyclical. As such, the electric motor must be appropriately sized to meet a variety of load requirements of the power tool.

Figure 1:
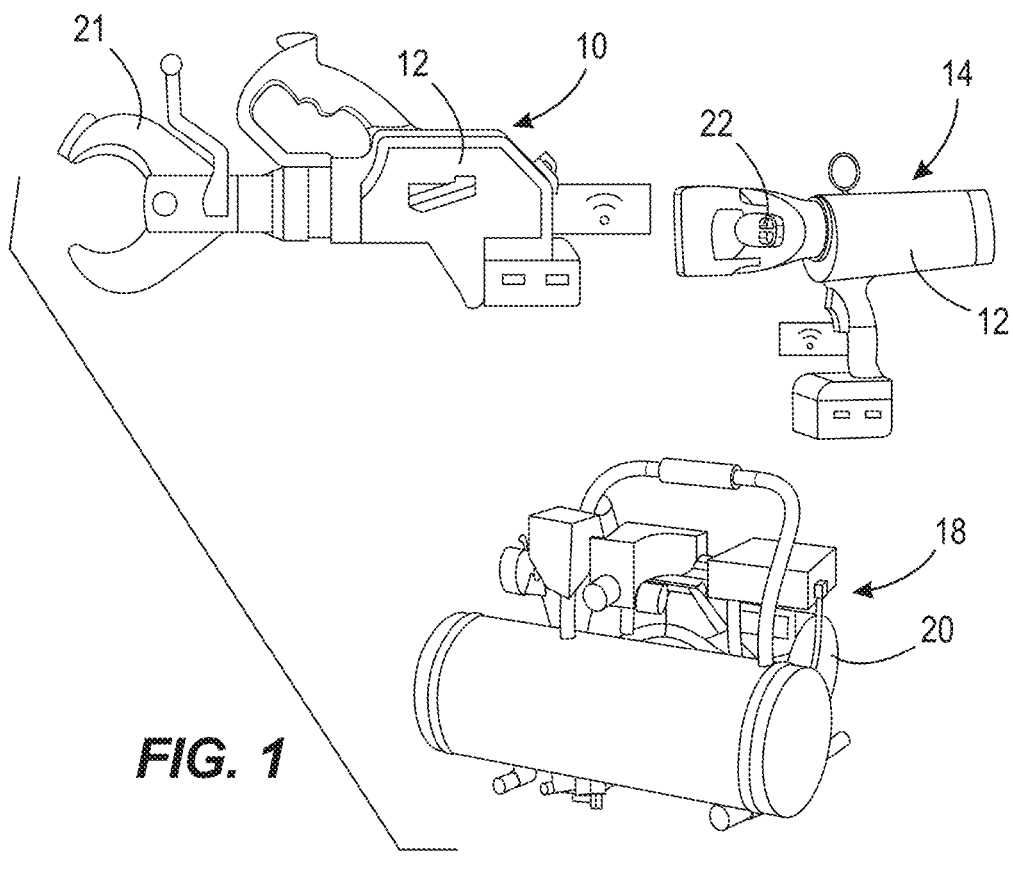
FIG. 1 illustrates various power tool applications with cyclical loads that require a high startup torque and high no-load speed.

With reference to FIG. 1, various power tools (e.g., cable cutter 10, cable cutter 14, and air pump 18) are illustrated. In alternative embodiments, the power tool may be an electrical crimper, a knockout tool, a pump (hydraulic, air, or water), a spreading tool, a press tool, or any other similar power tool. The power tools 10, 14, 18 operate in applications with a large startup torque requirement and a cyclical load (i.e., a repeating load profile) once the power tool motor has reached normal operating speed. The power tools 10, 14, 18 each include a housing 12, 16, 20 a driven tool element (i.e., a working element). For example, the tool element may be a claw 21, a jaw, a cutter 22, a bit, a piston, a crimper, a punch, etc. depending on the power tool application.

Figure 2:
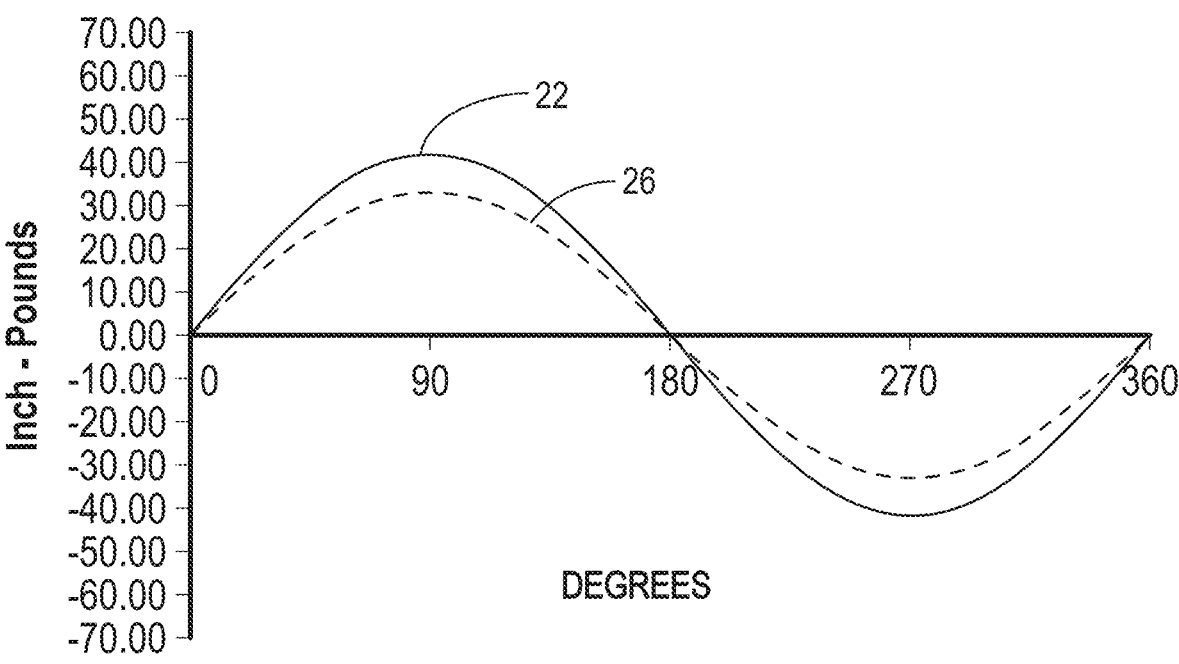
FIG. 2 is a graph of an example of a cyclical load of the power tool applications of FIG. 1, illustrated as torque as a function angular position.

With reference to FIG. 2, a first pump torque profile 24 and a second pump torque profile 26 are shown in inch-lbs. as a function of the rotational position (e.g., degrees) for a given maximum working pressure. When a pump in a power tool application is utilized, the pump piston reciprocates, slowly increasing pressure. During normal operation, the motor requires little power because of the rotationally stored energy of the motor, and the cyclical nature of the loading. In other words, normal operation of the pump is a high-speed and low torque scenario. In contrast, when the pump is stopped and a maximum pressure is acting on the piston, a substantial amount of torque is required (i.e., a high startup torque). The pump piston can stop during use just before its peak torque shown in FIG. 2, such that when the tool is turned back on there is a need for a very large startup torque. As such, the power tools 10, 14, 18 must include a motor that is sized to accommodate various worst-case loading scenarios, which can lead to costly and oversized motors.

Figure 3:
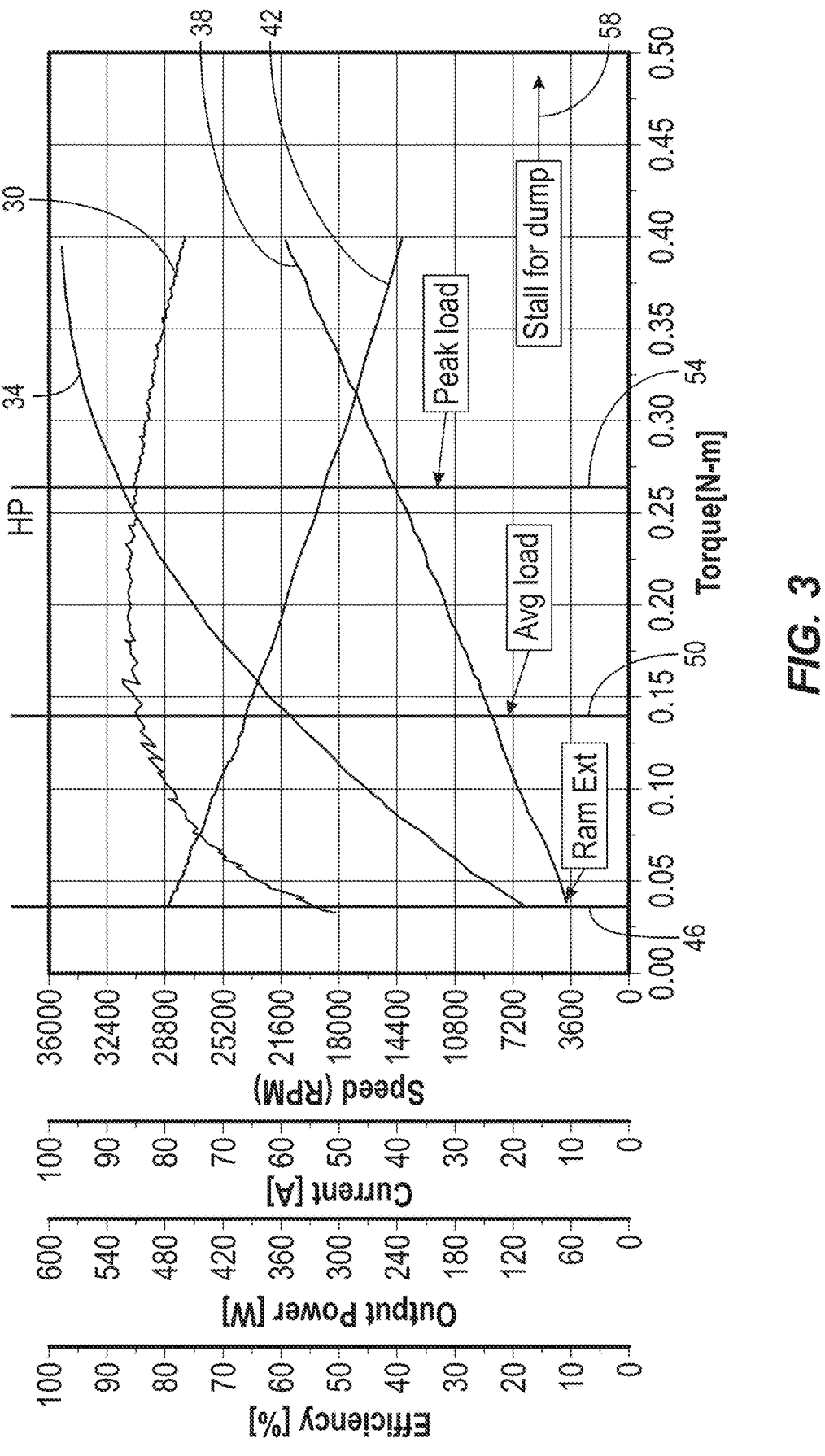
FIG. 3 is a graph illustrating electrical characteristic for a conventional motor as a function of torque, with various operating points associated with the power tool loading identified.

With reference to FIG. 3, the pump loading scenario for a conventional power tool having a brushless DC ("BLDC") motor, for example an interior permanent magnet ("IPM") motor, is illustrated. In other words, the electrical characteristics of a conventional IPM motor in a pump application are illustrated in FIG. 3. Specifically, FIG. 3 illustrates the efficiency 30, the output power 34, the current 38, and the speed 42 of the IPM motor as a function of torque. Various torque levels corresponding to various pump operating points are shown as vertical lines in FIG. 3. In particular, a low-torque, high speed no-load condition 46 during pressure build and ram extension, an average load condition 50, a peak load condition 54, and a stall load condition 58 (e.g., for pressure dump at maximum pressure, or startup torque)

indicated as outside the capabilities of the conventional motor. The motor spends much of its operation either in the no-load condition 46 or the start-up for heavy loads 58.

Figure 4:
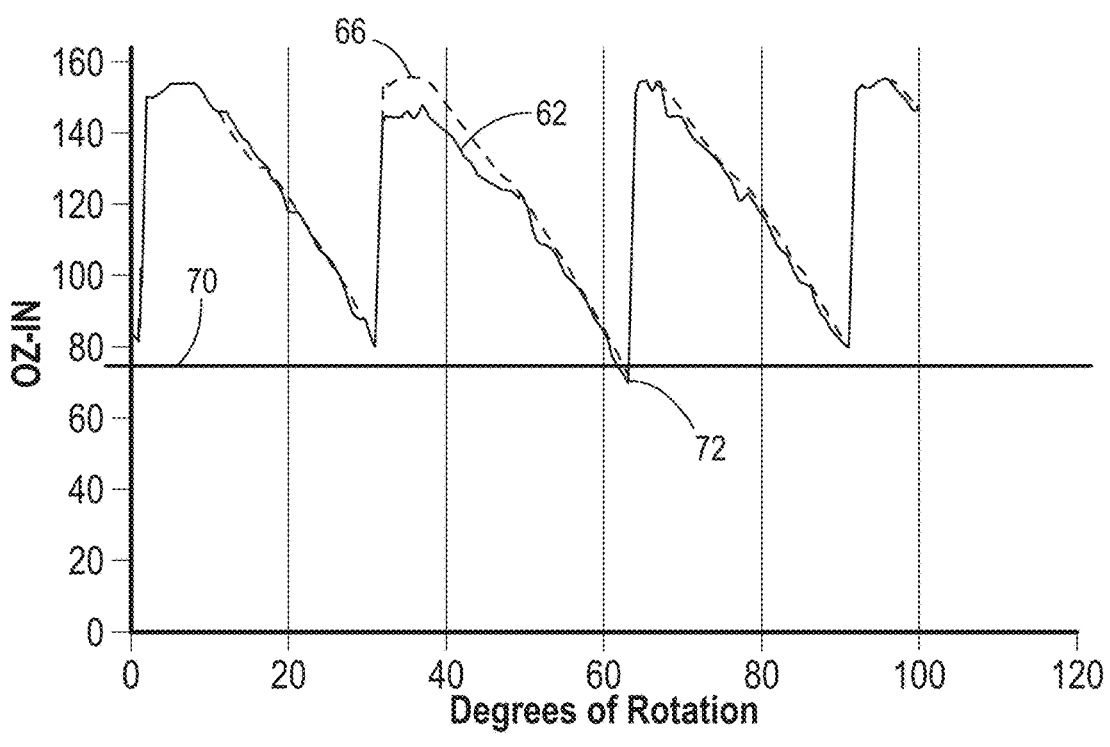
FIG. 4 is a graph illustrating the torque capability of a power tool motor as a function of angular position, with a minimum torque requirement level identified.

With reference to FIG. 4, the motor stall torque (in inch ounce-force) as a function of rotational position is illustrated. In particular, a motor torque 62 for a first operating voltage (e.g., 19.5 Volts) and a motor torque 66 for a second operating voltage (e.g., 17.5 Volts) as a function of rotational position (degrees). As discussed above, in some situations the pump piston can stop at a high compression stroke, and the motor can be in a rotational position that does not produce sufficient torque experience to be able to startup. In other words, the horizontal line 70 indicates the minimum torque requirements to achieve proper startup at a maximum pressure. In the illustrated embodiment, the horizontal line 70 is 76 oz-in and is representative of the peak load as maximum pressure. If the motor torque 62, 66 falls below the horizontal line 70 it creates a possible stall point 72 (FIG. 4) and the power tool may not properly start. As a result, power tool designs include larger and more powerful motors than what is typically needed for the majority of tool uses. In other words, accommodating the high startup torque in a power tool driven by an IPM motor comes at the expense of an increased tool size, cost, and efficiency.

More specifically, in order to increase the torque capabilities (e.g., the startup torque) of the BLDC motor, the motor size is increased (e.g., motor diameter or motor length is increased). However, increasing the BLDC motor size adds to the overall power tool size and cost. In addition, increasing the size of the BLDC motor to accommodate the worst-case load scenario (e.g., startup conditions) will result in an oversized motor for the remaining majority of the power tools operational needs (e.g., non-startup conditions). Finally, increasing the startup torque capability of the BLDC motor has the counterproductive effect of also decreasing the no-load speed. Decreasing the no-load speed is undesirable because once the motor has reached operational speeds, it is desirable to operate the motor as fast as possible in order to complete the task as fast as possible.

Figure 5:
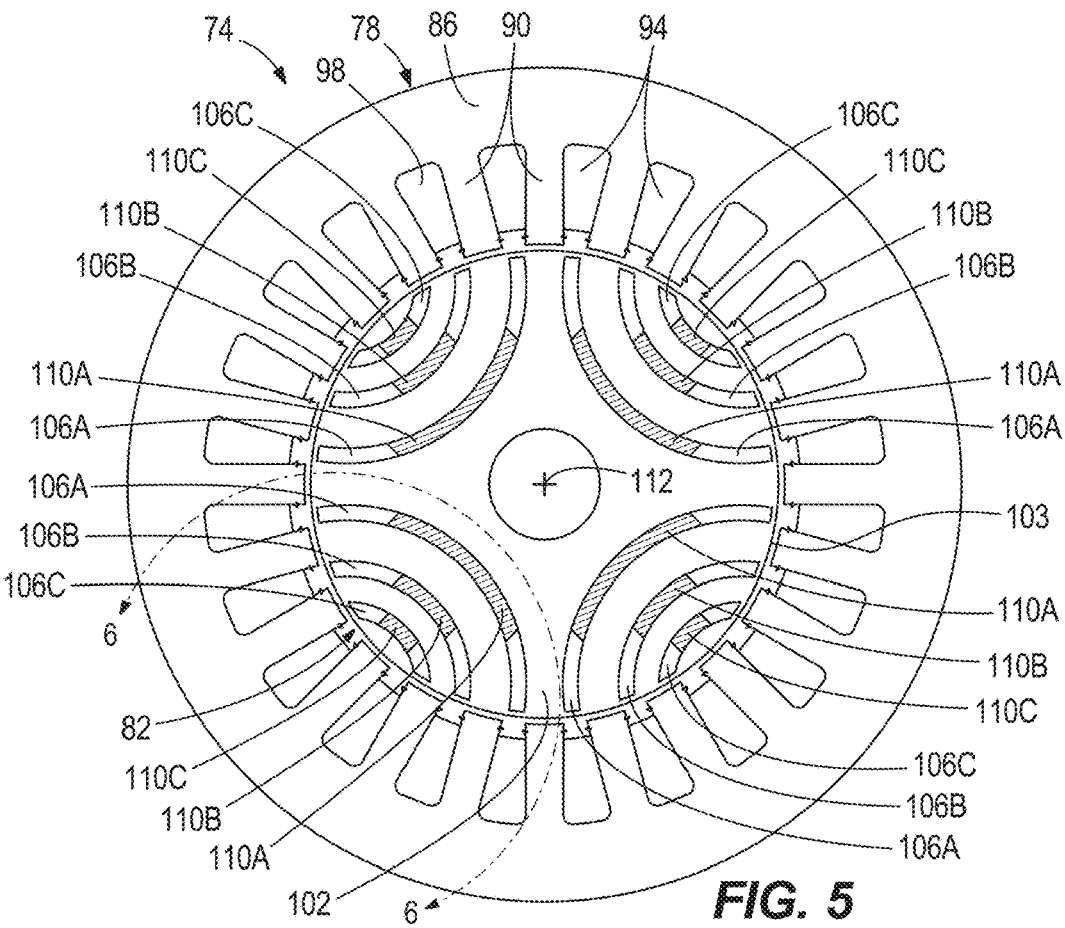
FIG. 5 is a cross-sectional view of a permanent magnet synchronous reluctance machine ("PMSRM"), according to embodiments described herein.

With reference to FIG. 5, the power tools 10, 14, 18 include a motor assembly positioned within the housings 12, 16, 20. In the illustrated embodiment, the motor assembly is a permanent magnet synchronous reluctance machine (PMSRM) 74. In other words, the power tools 10, 14, 18 include a permanent magnet synchronous reluctance machine 74 positioned within each of the housings 12, 16, 20 and operable to drive the tool element. In particular, FIG. 5 illustrates a cross-sectional view of the PMSRM 74. The permanent magnet synchronous reluctance machine (PMSRM) 74 may also be referred to a permanent magnet assisted synchronous reluctance machine (PMaSRM), a permanent magnet synchronous reluctance motor, or a permanent magnet assisted synchronous reluctance motor. The permanent magnet synchronous reluctance machine 74 is operable as either a motor or a generator.

The PMSRM 74 includes a stator 78 and a rotor 82. The stator 78 includes a stator body 86 with teeth 90, which define windings slots 94 that receive stator windings 98. In the illustrated embodiment, the teeth 90 extend radially inward. In some embodiments, the stator body 86 is a single solid ferromagnetic piece. In other embodiments, the stator body 86 is formed as a stack of stator laminations. In the illustrated embodiment, the stator 78 includes twenty four winding slots 94. In other embodiments, the stator 78 includes 25 or greater winding slots 94. In other embodiments, the stator 78 includes 23 or fewer winding slots 94. In some embodiments, the stator includes six or more winding slots 94. The stator windings may be distributed windings that span multiple teeth 90, which allows for multiple winding slots 94 to be used per pole. In some embodiments, the stator includes twelve or more winding clots 94.

With continued reference to FIG. 5, the rotor 82 includes a rotor body 102 with curved slots 106A, 106B, 106C (i.e., arcuate slots) formed in the rotor body 102. In some embodiments, the rotor body 102 is a single solid ferromagnetic piece. In other embodiments the rotor body 102 is formed as a stack of rotor laminations. The rotor 82 includes a first slot 106A, a second slot 106B and a third slot 106C. The first slot 106A is a different size than the second slot 106B, and the second slot 106B is a different size than the third slot 106C. In the illustrated embodiment, the first slot 106A is larger than the second slot 106B and the second slot 106B is larger than the third slot 106C. The rotor body 102, in the illustrated embodiment, includes four sets of the three slots 106A, 106B, 106C (i.e., a total of twelve slots). In other words, the rotor 82 is a 4-pole rotor. In other embodiments, the rotor 82 include 5 or more poles. In further alternative embodiments, the rotor 82 includes 3 or fewer poles. The slots 106A, 106B, 106C are operable as flux barriers. In the illustrated embodiment, portions of the slots 106A, 106B, 106C are empty and are configured as air flux barriers. In other embodiments, the slots 106A, 106B, 106C is at least partially filed with a flux barrier material. In some embodiments, two or fewer slots are define each rotor pole.

In addition, the rotor 82 includes permanent magnets 110A, 110B, 110C positioned within the slots 106A, 106B, 106C. In the illustrated embodiment, the permanent magnets 110A, 110B, 110C are curved to correspond to the arcuate shape of the slots 106A, 106B, 106C. The magnet material may include sintered or bonded ferrites, ceramic ferrites, ceramics, neodymium iron born (NdFeB). Bonded neodymium can be injected molded into slots from a front of the motor, whereas sintered neodymium is cut from a single block of material. With bonded neodymium, the material can be magnetized after injection, which greatly improves manufacturability and creates less waste. In addition, plastic inserts in magnet slots can be used to achieve less than 100% slot fill, which provides cost savings while still allowing for electrical functionality.

Figure 6:
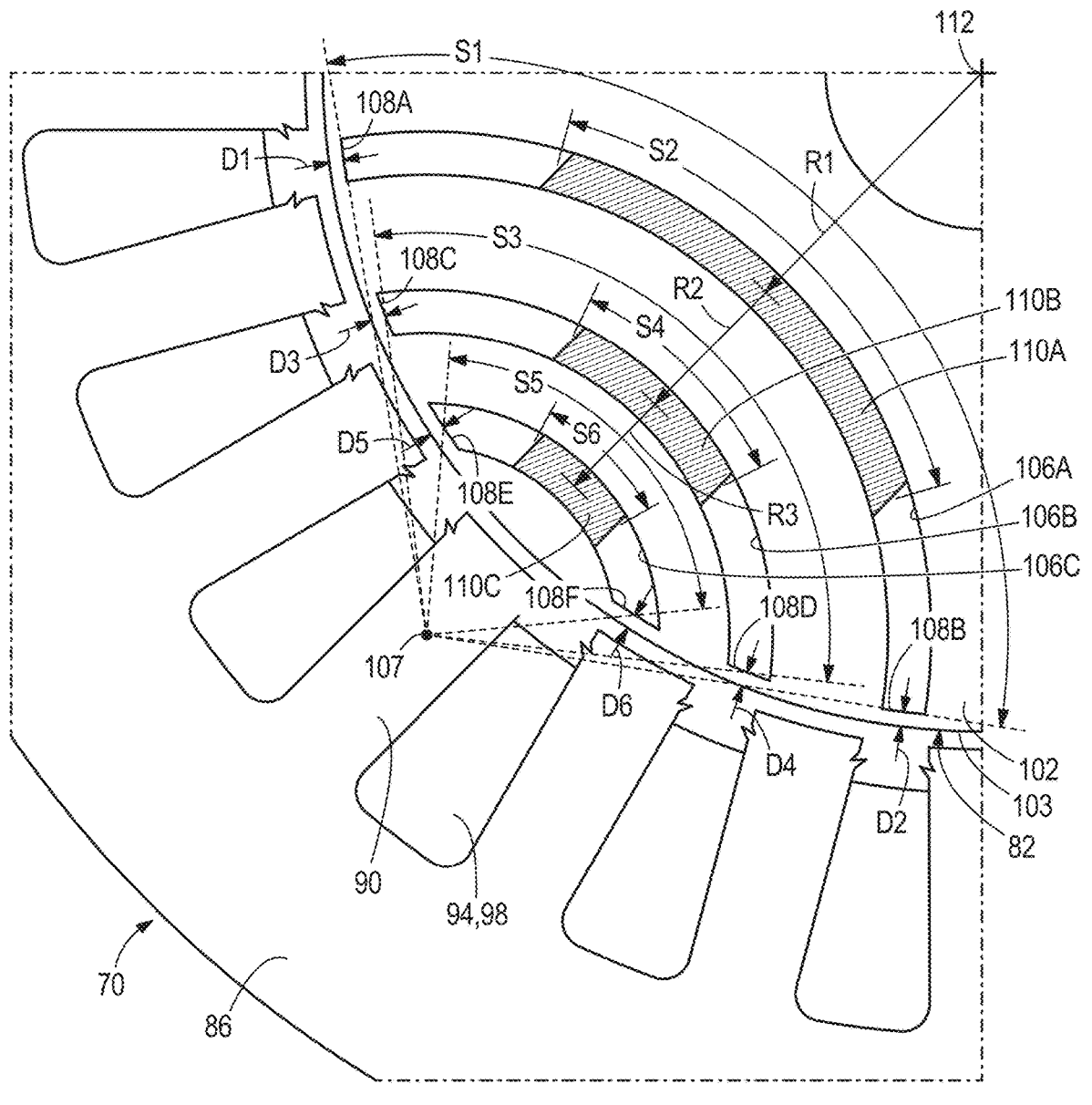
FIG. 6 is an enlarged partial view of the PMSRM of FIG. 5.

With reference to FIG. 6, the first slot 106A is positioned a first distance R1 from a center 112 of the rotor body 102, the second slot 106B is positioned a second distance R2 from the center 112, and the third slot 106C is positioned a third distance R3 from the center 112. The center 112 in the illustrated embodiment is the rotational axis of the rotor 82. The first slot 106A, the second slot 106B, and the third slot 106C are curved about a common point 107. In other words, the second slot 106B is partially nested within the first slot 106A and the third slot 106C is partially nested within the second slot 106B. In the illustrated embodiment, the common point 107 is positioned outside of the rotor body 102. Specifically, the common point 107 is located on a tooth 90 of the stator 78. In other words, the slots 106A, 106B, 106C are concave and curve about the point 107 positioned radially outward from an outer circumferential surface 103 of the rotor body 102.

With continued reference to FIG. 6, the ends of the slots 106A, 106B, 106C are spaced an equal distance away from the outer circumferential surface 103 of the rotor body 102. For example, a first dimension D1 measured between a first end 108A of the first slot 106A and the outer circumferential surface 103 is approximately the same distance as a second dimension D2 measured between a second end 108B of the first slot 106A and the outer circumferential surface 103. Likewise, a third dimension D3 measured between a first end 108C of the second slot 106B and the outer circumferential surface 103 is approximately the same distance as the first dimension D1. In other words, a distance D1-D6 from any end 108A-108D of each of the slots 106A, 106B, 106C is positioned approximately the same distance from the outer circumferential surface 103 of the rotor body 102.

With continued reference to FIG. 6, the first magnet 110A is positioned within the first slot 106A, the second magnet 110B is positioned within the second slot 106B, and a third magnet 110C is positioned within the third slot 106C. In the illustrated embodiment, the magnets 110A, 110B, 110C are positioned in the center of the slots 106A, 106B, 106C, respectively. The magnets 110A, 110B, 110C do not fill the entire slots 106A, 106B, 106C. For example, the first slot 106A has a span S1 of approximately 110 degrees about the common point 107 and the first magnet 110A has a span S2 of approximately 58 degrees about the common point 107. As such, the first magnet 110A spans within a range of approximately 50% to approximately 56% of the first slot 106A span. In the illustrated embodiment, the first magnet 110A spans approximately 53% of the first slot 106A span. Likewise, the second slot 106B has a span S3 of approximately 103 degrees about the common point 107 and the second magnet 110B has a span S4 of approximately 37 degrees about the common point 107. As such, the second magnet 110B spans within a range of approximately 33% to approximately 39% of the second slot 106B span. In the illustrated embodiment, the second magnet 110B spans approximately 36% of the section slot 106B span. Similarly, the third slot 106C has a span S5 of approximately 81 degrees about the common point 107 and the third magnet 110C has a span S6 of approximately 31 degrees about the common point 107. As such, the third magnet 110C spans within a range of approximately 35% to approximately 41% of the third slot 106C span. In the illustrated embodiment, the third magnet 110C spans approximately 38% of the third slot 106C span. As such, the magnet 110A-110C within each of the plurality of slots 106A-106C span less than approximately 56% of the slot.

Figure 6A:
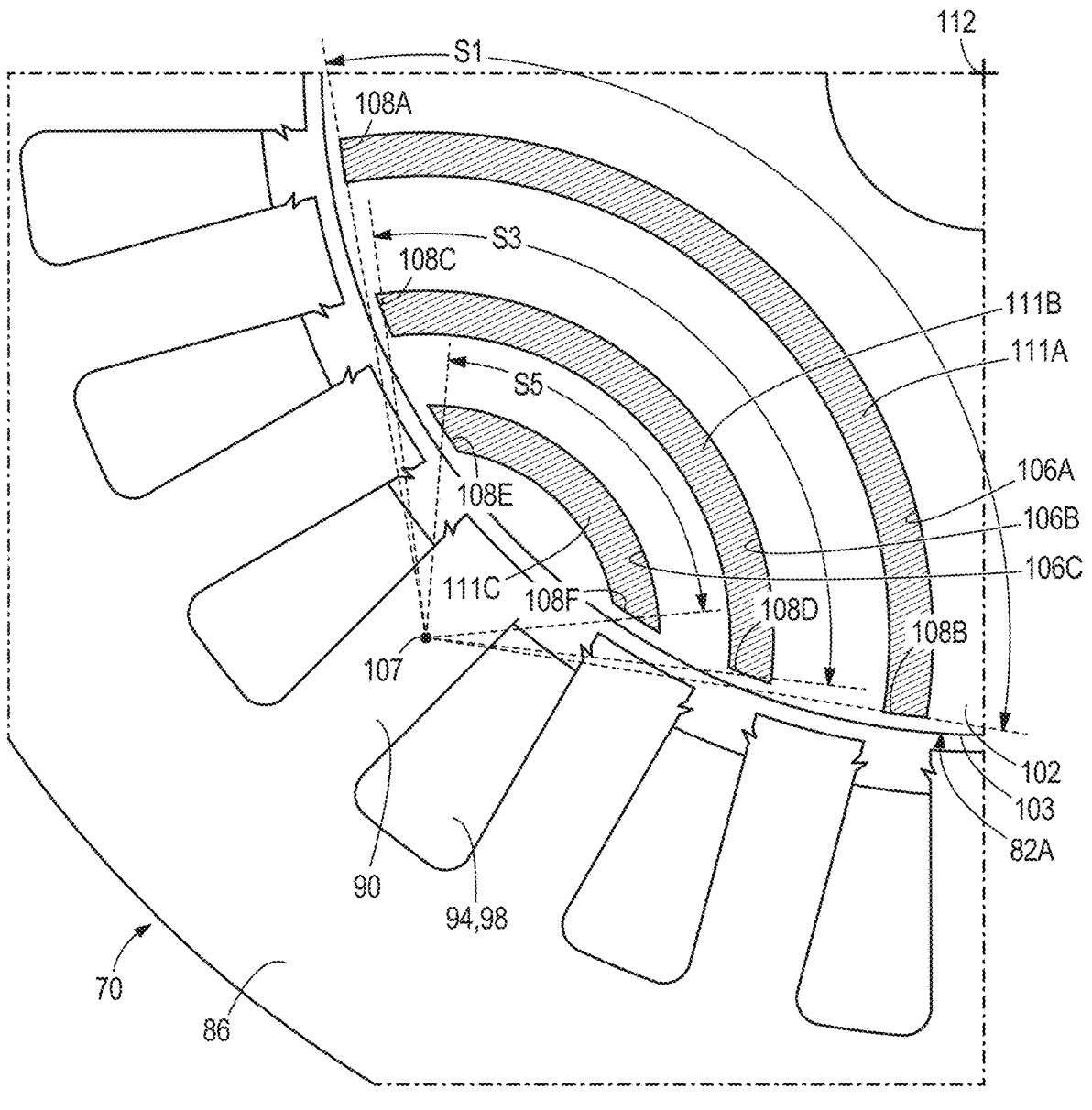
FIG. 6A is an enlarged partial view of a PMSRM, according to another embodiment described herein.

With reference to FIG. 6A, the rotor 82A includes a rotor body 102 with curved slots 106A, 106B, 106C (i.e., arcuate slots) formed in the rotor body 102. The rotor 82A is similar to the rotor 82 of FIG. 6 with similar reference numerals use to identify similar structure. The rotor 82A differs from the rotor 82 in that the rotor 82A includes permanent magnets 111A, 111B, 111C positioned within the entirety of the slots 106A, 106B, 106C. In the illustrated embodiment, the permanent magnets 110A, 110B, 110C are curved to correspond to the arcuate shape of the slots 106A, 106B, 106C and span 100% of the slot spans S1, S2, S3. In other words, the magnet 111A extends from end 108A to the end 108B of the slot 106A Likewise, the magnet 111B extends from end 108C to the end 108D of the slot 106B and the magnet 111C extends from end 108E to the end 108F of the slot 106C. In other embodiments, the magnets 111A, 111B, 111C may span less than 100% of the corresponding slots 106A, 106B, 106C.

Figure 7:
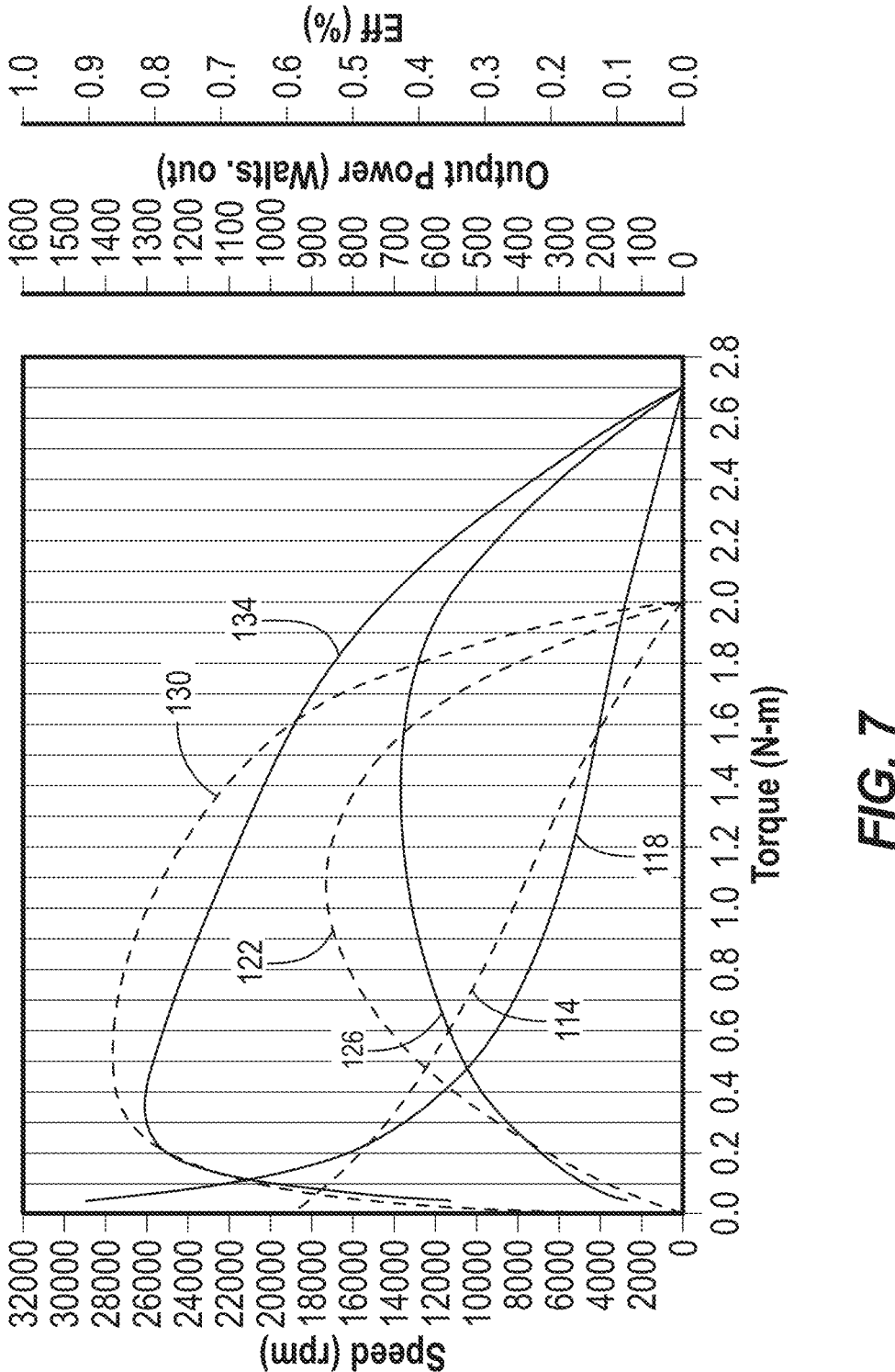
FIG. 7 is a graph comparing speed, output power, and efficiency of a conventional interior permanent magnet ("IPM") motor with the permanent magnet synchronous reluctance machine of FIG. 5.

With reference to FIG. 7, the capabilities of the PMSRM 74 are compared to the conventional IPM motor having of the same size. In other words, the comparison between the PMSRM 74 and the conventional IPM motor is made with motors having the same package size (i.e., volumetric space). First, an IPM motor speed 114 is compared to the PMSRM speed 118. The PMSRM speed 118 is higher than the IPM motor speed 114 at low torque (i.e., no-load conditions). In the illustrated embodiment, the PMSRM speed 118 at low torque is approximately 30% more than the IPM motor speed 114 at low torque. Second, an IPM motor power 122 is compared to the PMSRM power 126. The PMSRM power 126 is higher than the IPM power 122 at high torque levels because the PMSRM 74 is capable of producing more torque than the similarly sized IPM motor. In the illustrated embodiment, the PMSRM 74 produces approximately 25% more torque than the IPM motor. Third, an IPM motor efficiency 130 is compared to the PMSRM efficiency 134. The PMSRM efficiency 134 is higher than the IPM motor efficiency 130 at high torque conditions, and the PMSRM efficiency 134 is similar to the IPM motor efficiency 130 at low torque conditions. As such, the PMSRM 74 provides relevant speed, torque, power, and efficiency benefits when compared to the conventional IPM motor with the same package size.

The power tool 10, 14, 18 that includes the PMSRM 74 allows for improvement at two important operating conditions (i.e., the start-up torque and the no-load speed) without unnecessarily adding size and cost when compared to other BLDC motor types, including IPM motors, with the same package size. With the PMSRM 74, the power tool can be made smaller if desirable, or the extra torque capabilities can add a margin of success for extreme startup scenarios (e.g., for cold startups where the hydraulic fluid being pumped is less viscous). The permanent magnet synchronous reluctance motor 74 provides more startup torque than a BLDC motor with a same package size and provides a higher no-load speed than the BLDC motor with the same package size.

In addition to the improved operating characteristics, the PMSRM 74 includes less rare earth magnet material compared to a comparable IPM design. In some embodiments, the PMSRM 74 includes 50% of the magnets included in the conventional IPM design with the same package size. Magnet material is expensive and is subject to volatile financial markets. As such, reducing the required magnet material is desirable for long term cost and planning.

Although the disclosure has been described in detail with reference to certain preferred embodiments, variations and modifications exist within the scope and spirit of one or more independent aspects of the disclosure as described. Various features and advantages are set forth in the following claims.

What is claimed is:

1. A power tool comprising:
a housing;
a motor assembly positioned within the housing, the motor assembly including:
a stator with winding slots that receive stator windings, and
a rotor including:
a first slot positioned a first distance from a center of the rotor, the first slot having a first end of the first slot and a second end of the first slot,
a second slot positioned a second radial distance from the center of the rotor, the second slot having a first end of the second slot and a second end of the second slot,
a third slot positioned a third distance from a center of the rotor, and
an outer circumferential surface,
wherein the first slot, the second slot, and the third slot are curved about a common point,
wherein a first dimension measured between the first end of the first slot and the outer circumferential surface is approximately equal to a second dimension measured between the second end of the first slot and the outer circumferential surface, wherein a third dimension measured between the first end of the second slot and the outer circumferential surface is approximately equal to a fourth dimension measured between the second end of the second slot and the outer circumferential surface, and wherein the third slot includes a span of approximately 81 degrees about the common point, and wherein the third slot includes a third magnet within the third slot, the third magnet spans approximately 35% to 41% of the span of the third slot about the common point.

2. The power tool of claim 1, wherein the motor is a permanent magnet synchronous reluctance motor, and wherein the permanent magnet synchronous reluctance motor produces a motor efficiency of approximately 50% at 1.8 Nm of torque.

3. The power tool of claim 2, wherein the motor is a permanent magnet synchronous reluctance motor, and wherein the permanent magnet synchronous reluctance motor includes a power output of approximately 600 Watts at 1.9 Nm of torque.

4. The power tool of claim 3, wherein the motor is a permanent magnet synchronous reluctance motor, and wherein the permanent magnet synchronous reluctance motor operates at approximately 2000 revolutions per minute at approximately 2.2 Nm of torque.

5. The power tool of claim 1, wherein the common point is located radially outward from the outer circumferential surface on a tooth of the stator.

6. The power tool of claim 1, wherein the first slot includes a span of approximately 110 degrees about the common point, and wherein the first slot includes a first magnet within the first slot, the first magnet spans approximately 50% to 56% of the span of the first slot about the common point.

7. The power tool of claim 6, wherein the second slot includes a span of approximately 103 degrees about the common point, and wherein the second slot includes a second magnet within the second slot, the second magnet spans approximately 33% to 39% of the span of the second slot about the common point.

8. The power tool of claim 1, wherein the first dimension, the second dimension, the third dimension, and the fourth dimension are all approximately an equal distance from the outer circumferential surface.

9. A permanent magnet synchronous reluctance motor comprising:
  a stator with winding slots that receive stator windings, and
  a rotor including:
    a first slot positioned a first distance from a center of the rotor, the first slot having a first end of the first slot and a second end of the first slot,
    a second slot positioned a second radial distance from the center of the rotor, the second slot having a first end of the second slot and a second end of the second slot, and
    an outer circumferential surface,
  wherein the first slot and second slot are curved about a common point,
  wherein a first dimension measured between the first end of the first slot and the outer circumferential surface is approximately equal to a second dimension measured between the second end of the first slot and the outer circumferential surface, wherein a third dimension measured between the first end of the second slot and the outer circumferential surface is approximately equal to a fourth dimension measured between the second end of the second slot and the outer circumferential surface, and wherein the first slot includes a span of approximately 110 degrees about the common point, and wherein the second slot includes a span of approximately 103 degrees about the common point.

10. The motor of claim 9, wherein the permanent magnet synchronous reluctance motor produces a motor efficiency of approximately 50% at 1.8 Nm of torque.

11. The motor of claim 10, wherein the permanent magnet synchronous reluctance motor includes a power output of approximately 600 Watts at 1.9 Nm of torque.

12. The motor of claim 11, wherein the permanent magnet synchronous reluctance motor operates at approximately 2000 revolutions per minute at approximately 2.2 Nm of torque.

13. The motor of claim 9, wherein the common point is located on a tooth of the stator.

14. The motor of claim 9, the motor further comprising:
  a first magnet within the first slot, the first magnet spans approximately 50% to 56% of the span of the first slot about the common point; and
  a second magnet within the second slot, the second magnet spans approximately 33% to 39% of the span of the second slot about the common point,
  wherein the second slot is partially nested within the first slot.

15. The motor of claim 14, the rotor further comprising:
  a third slot positioned a third distance from a center of the rotor, the third slot being curved a span of approximately 81 degrees about the common point; and
  a third magnet within the third slot, the third magnet spans approximately 35% to 41% of the span of the third slot about the common point,
  wherein the third slot is partially nested within the second slot.

16. A permanent magnet synchronous reluctance motor comprising:
  a stator with winding slots that receive stator windings, and
  a rotor including:
    a first slot positioned a first distance from a center of the rotor, the first slot having a first magnet within the first slot, the first magnet having a span of approximately 58 degrees about a common point,
    a second slot positioned a second radial distance from the center of the rotor, the second slot having a second magnet within the second slot, the second magnet having a span of approximately 37 degrees about the common point, and
    wherein second slot is partially nested within the first slot, and
    wherein the common point is located on a tooth of the stator.

17. The motor of claim 16, wherein:
  the permanent magnet synchronous reluctance motor produces a motor efficiency of approximately 50% at 1.8 Nm of torque;
  the permanent magnet synchronous reluctance motor includes a power output of approximately 600 Watts at 1.9 Nm of torque; and the permanent magnet synchronous reluctance motor operates at approximately 2000 revolutions per minute at approximately 2.2 Nm of torque.

* * * * *